US012234131B2

(12) United States Patent
Jones

(10) Patent No.: US 12,234,131 B2
(45) Date of Patent: Feb. 25, 2025

(54) CABLE SPOOLING APPARATUS

(71) Applicant: MACTAGGART SCOTT (HOLDINGS) LIMITED, Loanhead Lothian (GB)

(72) Inventor: David Jones, Edinburgh Lothian (GB)

(73) Assignee: MACTAGGART SCOTT (HOLDINGS) LIMITED, Loanhead (GB)

( * ) Notice: Subject to any disclaimer, the term of this patent is extended or adjusted under 35 U.S.C. 154(b) by 225 days.

(21) Appl. No.: 17/780,841

(22) PCT Filed: Nov. 26, 2020

(86) PCT No.: PCT/GB2020/053007
§ 371 (c)(1),
(2) Date: May 27, 2022

(87) PCT Pub. No.: WO2021/105678
PCT Pub. Date: Jun. 3, 2021

(65) Prior Publication Data
US 2023/0011120 A1 Jan. 12, 2023

(30) Foreign Application Priority Data
Nov. 30, 2019 (GB) ..................................... 1917562

(51) Int. Cl.
*B66D 1/38* (2006.01)
*B65H 57/00* (2006.01)
(Continued)

(52) U.S. Cl.
CPC ............ *B66D 1/38* (2013.01); *B65H 57/006* (2013.01); *B65H 59/005* (2013.01); *B65H 59/18* (2013.01); *B65H 75/4407* (2013.01); *B66D 1/50* (2013.01)

(58) Field of Classification Search
CPC ........ B66D 1/741; B66D 1/7415; B66D 1/50; B66D 3/003; B66D 3/006; B65H 57/006;
(Continued)

(56) References Cited

U.S. PATENT DOCUMENTS 4,778,121 A * 10/1988 Minnee .................... B66D 1/38 242/157.1
5,009,353 A * 4/1991 Alquist .................. B66D 3/003 242/157.1
(Continued)

FOREIGN PATENT DOCUMENTS

| | | |
|---|---|---|
| DE | 91 14 964 | 2/1992 |
| WO | 2013/150281 | 10/2013 |

OTHER PUBLICATIONS

International Search Report and Written Opinion of the ISA for PCT/GB2020/053007 dated Feb. 16, 2021, 16 pages.

*Primary Examiner* — Sang K Kim
*Assistant Examiner* — Nathaniel L Adams
(74) *Attorney, Agent, or Firm* — Nixon & Vanderhye P.C.

(57) ABSTRACT

A cable spooling apparatus for use with a storage drum for spooling and storing cable. The cable spooling apparatus comprises a tensioning unit for adjusting the tension of a cable as it is being spooled onto the storage drum. The tensioning unit traverses a path between the opposite ends of the storage drum. Methods of spooling and unspooling cable using the apparatus are also disclosed.

17 Claims, 4 Drawing Sheets

(51) Int. Cl.
*B65H 59/00* (2006.01)
*B65H 59/18* (2006.01)
*B65H 75/44* (2006.01)
*B66D 1/50* (2006.01)

(58) Field of Classification Search
CPC ... B65H 59/005; B65H 59/18; B65H 75/4407
See application file for complete search history.

(56) References Cited

U.S. PATENT DOCUMENTS

| | | | | |
|---|---|---|---|---|
| 6,719,275 | B1 * | 4/2004 | Waterson | B66D 1/7415 254/333 |
| 6,811,112 | B1 * | 11/2004 | Currie | B66D 1/38 242/548.1 |
| 2005/0230671 | A1 * | 10/2005 | Mott | B66D 1/38 254/266 |
| 2006/0237565 | A1 * | 10/2006 | Barker | B66D 1/38 242/397.2 |
| 2016/0305199 | A1 * | 10/2016 | Fetters, III | B66D 1/28 |
| 2019/0161315 | A1 | 5/2019 | Bergan | |

* cited by examiner

CABLE SPOOLING APPARATUS

This application is the U.S. national phase of International Application No. PCT/GB2020/053007 filed Nov. 26, 2020 which designated the U.S. and claims priority to GB Patent Application No. 1917562.9 filed Nov. 30, 2019, the entire contents of each of which are hereby incorporated by reference.

FIELD OF THE INVENTION

The invention relates to the field of spooling cable onto a storage drum.

BACKGROUND TO THE INVENTION

When spooling cable onto a storage drum, it is necessary to maintain the cable under tension. Cable slack when spooling can result in cable damage due to crushing or nicking of the cable. It is often necessary to supply the required cable tension and this is carried out in the art using a specialised tensioning unit. These tensioning units go under a variety of names, such as transfer unit, linear tensioning unit (LTU) or linear winch.

In a conventional cable spooling apparatus illustrated in schematic form in FIG. 1, the tensioning unit (2) is fixed in position and a cable (4) typically passes from the tensioning unit, possibly by way of a sheave, to the cable storage portion (6) of a storage drum (8). A spooling device (10) located between the tensioning unit and storage drum may guide the spooling of the cable into the drum. As the cable spools onto the drum, the angle subtended by the cable and the centre line of the sheave decreases from a maximum with the cable at one (first) end (12) of the cable storage portion, through zero, to a maximum with the cable at the other (second) end (14) of the cable storage portion.

The maximum angle at which the cable extends onto the drum (i.e. the inclusive angle between the direction in which the cable extends onto the drum and a plane orthogonal to the axis of the drum, when the cable is being fed to an edge of the storage portion of a drum) is referred to as the fleet angle. A cable extending towards the drum from a distance has to bend by up to the fleet angle to be fed onto the drum.

The fleet angle has been exaggerated in FIG. 1 for clarity. Several factors come into play in determining the maximum practicable fleet angle. These include the nature and size of the cable being spooled and whether or not the storage drum is grooved. Nevertheless, generally the maximum fleet angle usable in practice is 1.5° to 2°. Use of fleet angles which exceed this results in problems such as bad spooling, and excess cable wear due to rubbing, crushing or abrasion. If the fleet angle is too small, problems arise due to the cable piling up on itself.

The necessity to keep the fleet angle at 2° or below results in a correspondingly large distance between the tensioning unit/sheave and the spooling device/storage drum. This distance is lost space and can pose a critical problem in situations where space is limited, for example in marine vessels. The invention seeks to provide a more compact arrangement which can adequately spool cable onto a storage drum.

The reverse operation, of unspooling cable, can be simpler in that it is not necessary to control the position of the cable on the storage drum. However it remains important to control the tension of cable during unspooling and embodiments of the invention will typically also be useful for unspooling cable.

SUMMARY OF THE INVENTION

In a first aspect the present invention provides a cable handling apparatus for use in conjunction with a storage drum for spooling cable, said apparatus comprising:

a support (e.g. a base);

a travelling member moveably mounted to the support;

a tensioning unit for adjusting the tension of said cable, the tensioning unit mounted on said travelling member and having a cable entry point and a cable exit point, whereby cable, when present, extends from the cable exit point to the storage drum;

wherein the travelling member is moveably mounted to said support, such that the cable exit point traverses a path between first and second positions where the tensioning unit feeds cable to or from opposite first and second ends respectively of a cable storage portion of the storage drum.

Accordingly, the cable exit point of the tensioning unit travels during operation. The tensioning unit thereby regulates cable tension and through its movement regulates the guidance of cable backwards and forwards onto the storage drum. However, the space between a conventional tensioning unit and a conventional spooling device which normally is required to maintain the fleet angle within an acceptable range can be substantially reduced. A system which is considerably more compact than conventional systems is thus achieved, without any loss of technical functionality.

The cable handling apparatus is typically also capable of unspooling the cable from the storage drum while regulating the tension of the cable using the tensioning unit, although this is not essential.

By the cable entry point we refer to the point of the tensioning unit which received cable first contacts while spooling onto the storage drum. By cable exit point we refer to the point of the tensioning unit from which cable extends to the storage drum. During unspooling, the direction of cable movement will be reversed.

Typically, the apparatus is configured such that the cable extends directly from the cable exit point to the storage drum, i.e. without contact with any element (such as a sheave or wheel) which may cause it to bend. The travelling member and tensioning unit are preferably configured such that the cable, when present, extends from the cable exit point to the storage drum in a straight line.

The travelling member and tensioning unit are preferably arranged such that they regulate the position at which the cable spools onto the storage drum. Movement of the travelling member and tensioning unit thereby regulates the feeding of the cable onto the storage drum backwards and forwards between the first and second ends of the cable storage portion. The travelling member and tensioning unit may together function as a spooling device.

The cable extending from the cable exit point to the storage drum in a straight line minimises bending in the cable which could cause wear or damage.

The tensioning unit typically grips the cable and urges the cable to move along its length. The tensioning unit may be a linear tensioning unit. In such a configuration, the cable passes in a straight line through the tensioning unit and onto the cable storage portion of the storage drum. Excessive bending of the cable is thus avoided. In this way, wear and damage to the cable is minimised. However, the tensioning unit may be a curved tensioning unit or a transfer unit.

The tensioning unit may comprise a sheave and belt. In order to avoid excessive bending or kinking of the cable in this configuration the cable leaves the sheave at a tangent.

After the cable leaves the sheave, it passes onto the cable storage portion of the storage drum. The sheave and the belt together apply a compression force on the cable. The cable is squeezed, or clasped, between sheave and belt. Friction between the cable and the sheave and belt transmits motion to the cable when the sheave rotates and the belt moves. The sheave may comprise a groove for the cable.

In a further arrangement the tensioning unit may comprise two opposing belts which constrain the cable, when in place, to follow a curved path between the belts. In this arrangement, the two opposing belts are arranged to squeeze or clasp the cable, thus applying an axial force on the cable. Friction between the belts and the cable translates the cable along the direction of its axis as the belts move.

It is preferred that the first and second positions are aligned with the first and second ends of the cable storage portion. The first and second positions are typically selected to feed cable directly to the first and second ends of the cable storage portion. Thus, the tensioning unit and travelling member may function as a spooling unit.

It may be that the travelling member is pivotably mounted to the support (typically at the first end). A pivotal mount enables the travelling member to traverse the path between the first and second positions. This path is an arc. In this case, the cable exit point of the tensioning unit traverses an arc between the first and second positions.

Thus, the path between the first and second positions may be curved, for example an arc. In a configuration where the travelling member is solely pivotably mounted to the support, with no translational freedom between travelling member and support, the path between the first and second positions will be curved. Such a configuration is both readily constructed and mechanically stable.

The travelling member may be translatably coupled to the support such that the cable exit point moves laterally between the first and second positions in use. Such an arrangement of the apparatus minimises any lateral tension on the cable at the point of contact with the spool as it spools onto, or unwinds from, the cable storage drum always at a right angle to the drum axis. Thus, the cable exit point of the tensioning unit may move back and forth, typically in a straight line, between the first and second positions.

The cable handling apparatus may further comprise a travelling member drive mechanism to drive the movement of the travelling member relative to the support. In this way the path can be traversed in a controllable manner. This enables controlled spooling of the cable onto the storage drum, with cable received by the storage drum typically extending alternately backwards and forwards between the first and second ends of the cable storage portion of the storage drum.

The mechanism may comprise a hoisting screw, a self-reversing screw, a belt, a linear actuator, or any other means of controlled motion. Each of these options offers a stable mechanical implementation of the drive mechanism to drive the movement of the travelling member relative to the support.

Typically, the apparatus comprises a drive mechanism configured to drive the tensioning unit to feed cable. Typically, the apparatus comprises a drive mechanism configured to rotate the storage drum to wind cable. The apparatus may further comprise a storage drum.

In a further possible development, there may be a drive mechanism configured to both drive the tensioning unit to feed cable and to drive rotation of a storage drum to wind cable in concert. Thus, the drive mechanism may regulate together the rate of movement of cable through the tensioning unit and the rate of rotation of a storage drum. The tensioning unit and the storage drum may thereby share the load of urging the cable. This reduces the maximum force which must be applied to the cable at any point along the cable, which minimises wear and damage. The drive mechanism may regulate the tension of the cable between the tensioning unit and a storage drum.

The cable handling apparatus may further comprise a motor to operate the mechanism to drive the movement of the travelling member relative to the support and/or rotation of the storage drum and/or the tensioning unit to displace the cable along its axis.

The tensioning unit may comprise separate first and second gripping regions, spaced along the length of the cable, wherein at each region the cable is gripped from both sides and urged in an axial direction in use. Each gripping region typically comprises first and second gripping members, on either side of the cable. The first and/or second gripping members may comprise a belt. The belt, or belts may be linear in the gripping regions. Either or both gripping regions may be formed by a belt partially wrapped around a sheave. The or each sheave may comprise a groove for guiding the cable. The first and second gripping regions may urge the cable in a straight line. The tensioning unit may be a linear tensioning unit. The tensioning unit may be configured to guide the cable in a curve. The first and/or second gripping regions may be curved, for example the first gripping member may be a curved member (e.g. a belt) and the second gripping member may comprise a sheave which the cable extends partially around in use.

The present invention extends in a second aspect to a method of spooling a cable onto a storage drum, the method utilising a tensioning unit to tension said cable, whereby said cable enters a cable entry point of said tensioning unit and exits at a cable exit point of said tensioning unit, whereby the tensioning unit travels in use such that the cable exit point of the tensioning unit traverses a path between first and second positions wherein in the first position it feeds cable to a first end of a cable storage portion of the storage drum and in the second position it feeds cable to an opposite second end of the cable storage portion of the storage drum.

Typically, the tensioning unit travels such that the cable exit point of the tensioning unit alternates between the first and second position. The tensioning unit may be pivotably mounted to a support, such as a base. The cable exit point of the tensioning unit may therefore travel along a curved path, such as an arc, between the first and second positions and back again. The tensioning unit may therefore rotate in use. The tensioning unit may be translatably coupled to a support, such as a base. The cable exit point of the tensioning unit may therefore travel along a straight path between the first and second positions and back again. The tensioning unit may therefore translate laterally in use.

Typically, cable is fed from the tensioning unit to the storage drum without lateral tension.

The method may comprise driving movement of the tensioning unit with a motor. The method may comprise driving the tensioning unit to feed cable and driving the rotation of the storage drum in concert. Thus the force used to urge the cable through the tensioning unit onto the storage drum may be shared between the tensioning unit and the storage drum.

Further optional features of the second aspect of the invention correspond to those described above in relation to the first aspect of the invention.

DESCRIPTION OF THE DRAWINGS

Example embodiments of the present invention will now be illustrated with reference to the following Figures in which.

DETAILED DESCRIPTION OF EXAMPLE EMBODIMENTS

Figure 2:
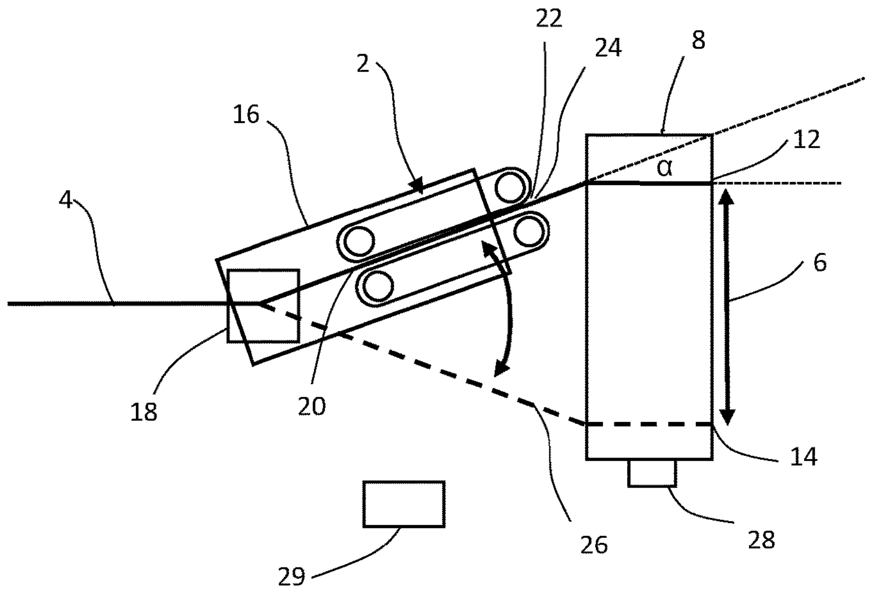
FIG. 2 is a schematic diagram of a spooling arrangement according to the present invention.

With reference to FIG. 2, a cable spooling apparatus (1) according to the invention comprises a tensioning unit (also known as a transfer unit), in this case a linear tensioning unit (2) (LTU). The LTU is, or is attached to, a member which moves in use, referred to as a travelling arm (16). The travelling arm (16) is pivotably mounted to a base (18). In use, cable (4) extends into the LTU where it engages with a cable entry point (20) of the LTU and passes through the LTU to a cable exit point (22). In FIG. 2 the cable exit point (22) is shown in a first position (24), at one extent of its travel. The fleet angle is shown as a. In the first position (24), the LTU is aligned such that cable from the LTU passes in a straight line to the first end (12) of a cable storage portion (6) of the storage drum (8). The travelling arm (16) may pivot around the base (18) until, at the other extent of its travel, the cable exit point (22) is at a second position (26) from which cable from the LTU passes in a straight line to the opposite second end (14) of cable storage portion (6) of the storage drum (8).

The storage drum (8) is coupled to a storage drum motor (28) which drives rotation of the storage drum (8) around its axis during operation. A travelling arm motor (27) is coupled to the travelling arm to drive rotational motion of the travelling arm (16) around the pivot. A controller (29), such as a microprocessor or microcontroller, is in electronic communication with the storage drum motor (28), travelling arm motor (27) and the tensioning unit motor (40), for example through wires, and is configured to drive the motors in concert as will be described. One skilled in the art will appreciate that the motors illustrated in FIG. 2 may also be implemented using only two, or only one motor, with a suitable mechanical transmission.

During operation, in order to spool cable (4) onto the storage drum (8), the LTU (2) and storage drum motor (28) are driven together to urge cable (4) through the LTU onto the storage drum (8), which rotates in order to take up the cable (4). The LTU (2) and the storage drum motor (28) share the load of pulling the cable (4). Each provides a force to urge the cable onto the storage drum (8). This distribution of force reduces the maximum axial force which must be applied to the cable at any one point. The speed of movement of cable through the LTU (2) and the tangential speed of rotation of the storage drum (8), given the thickness of cable already stored on the storage drum (8) are generally the same.

During spooling onto the storage drum, while the LTU (2) and storage drum motor (28) are operated, the travelling arm (16) is moved by the travelling arm motor (27) so that the cable exit point (22) of the LTU (2) moves smoothly along an arc from the first position (24) to the second position (26) and back again. Thus, the travelling arm (16) functions as a spooling device, feeding cable and directing cable back and forth along the cable storage portion (6) of the storage drum (8). The first and second positions (24, 26) of the cable exit point (22) are aligned with the first and second ends (12, 14) of the cable storage portion (6). The first and second positions are spaced apart by the same distance as the end of the cable storage portion except for a small margin due to the fleet angle, again up to about 2° at either end which means that the first and second ends (12, 14) of the cable storage portion (6) may be slightly further apart than the first and second positions (24, 26) of the cable exit point (22).

Figure 3:
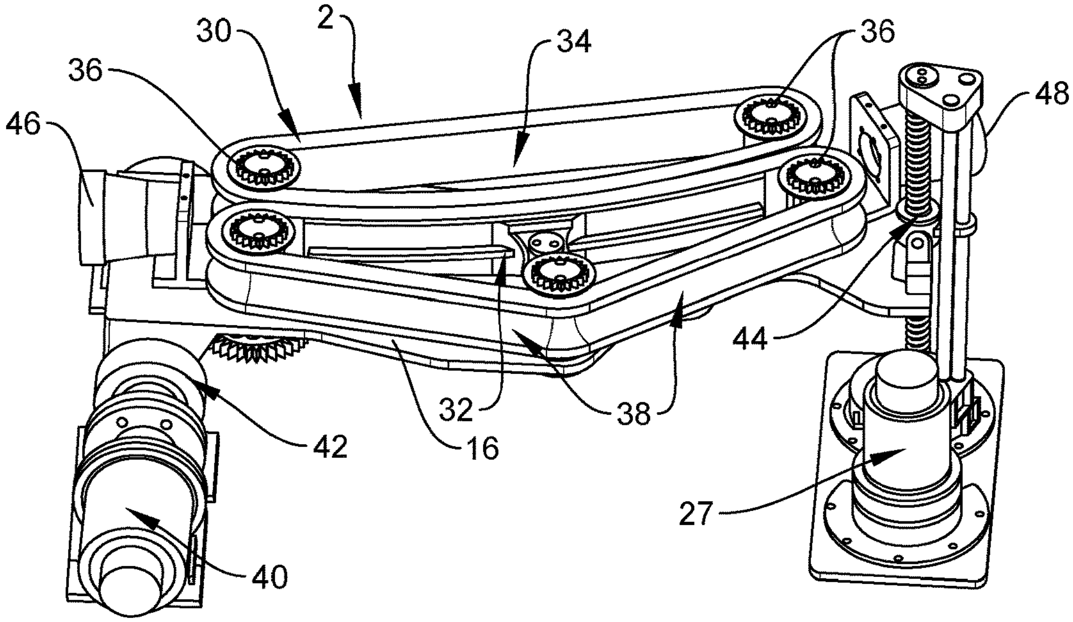
FIG. 3 is a schematic diagram of a pivotably mounted tensioning unit for use with the invention.
Figure 4A:
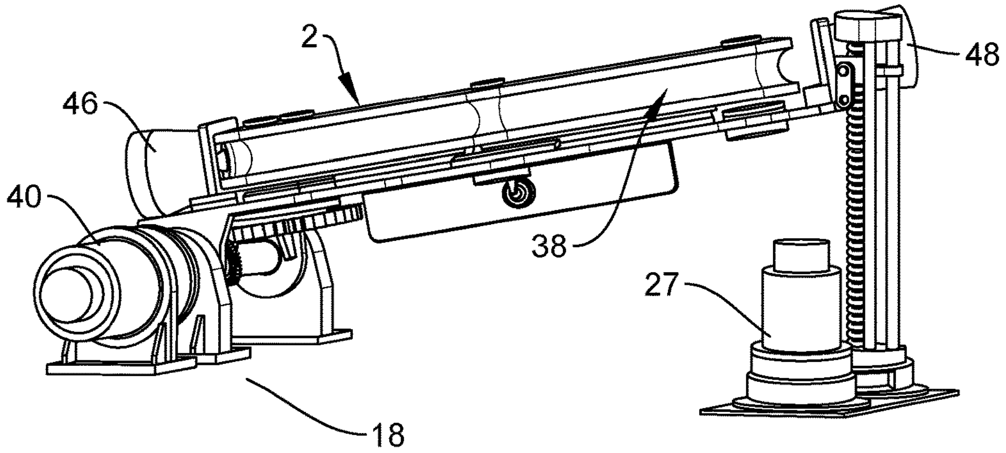
FIGS. 4A and 4B are schematic diagrams of the tensioning unit of FIG. 3 with the cable exit point at the first position and the second position respectively.
Figure 4B:
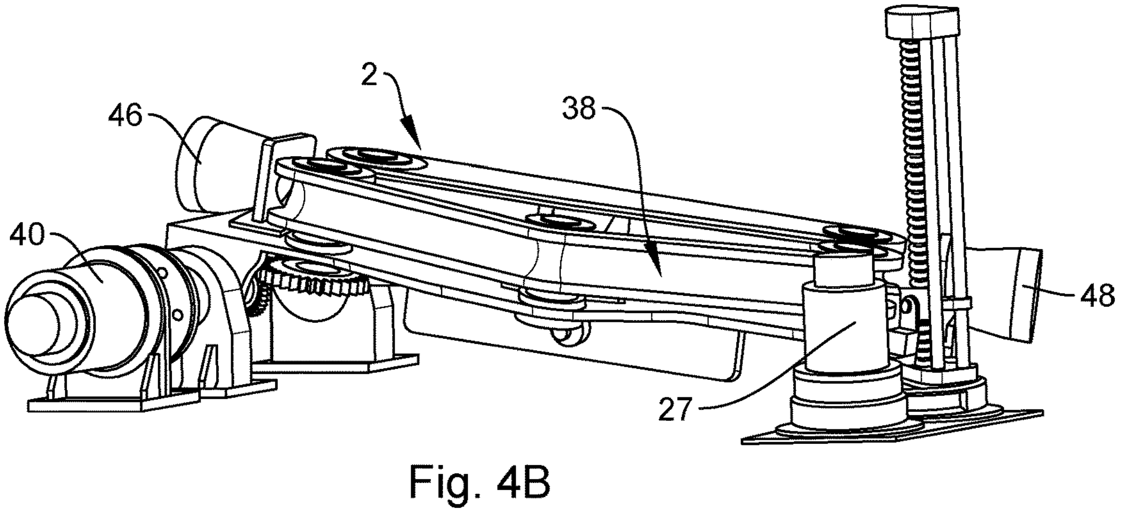
Figure 5:
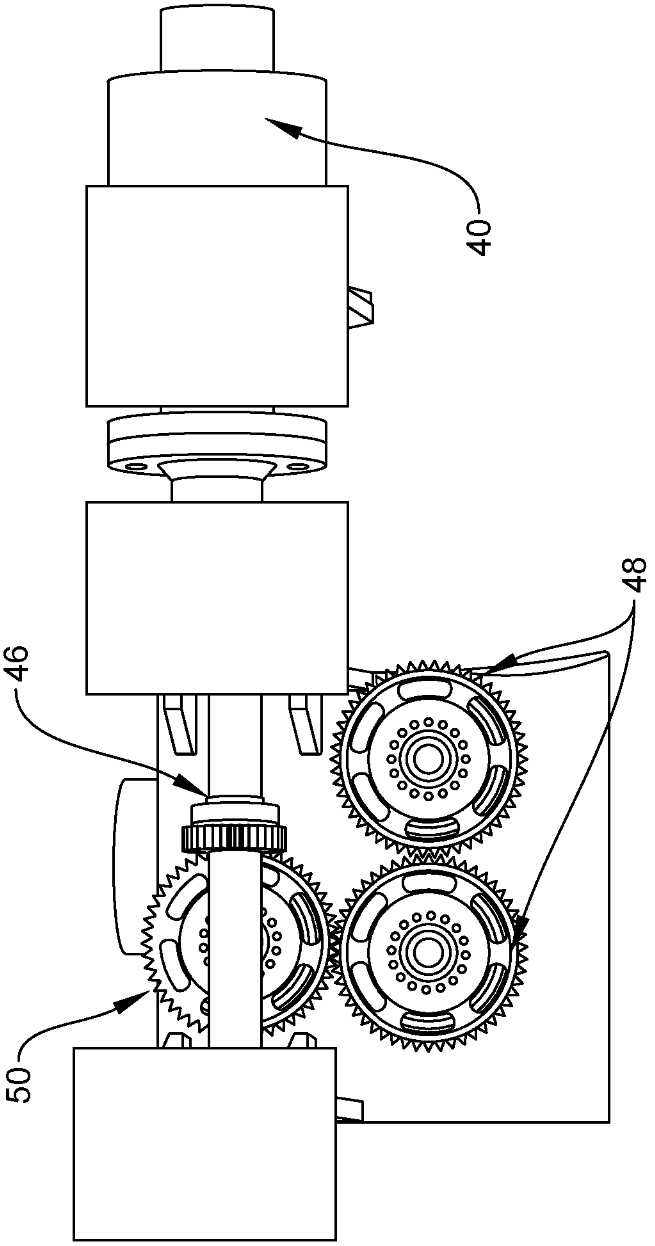
FIG. 5 is a schematic diagram of a drive gear arrangement for belts for the spooling arrangement of the present invention.

FIG. 3 illustrates machinery for driving the travelling arm (16) and tensioning unit (2) (in this case a curved tensioning unit) in a practical implementation. In this example, the tensioning unit comprises two rubber belts (30) and a spring loading pad (32), and a fixed loading pad (34), which is out of sight in FIG. 3. The belts (30) extend around pulleys (36) and have a central groove (38) within which the cable (4) is located and compressed (squeezed between the loading pads (32, 34)) during operation. A belt drive motor (40) provides force to moves the belts (30) to urge a cable (4) through the tensioning unit (2) in use. The travelling arm (16) and tensioning unit (2) are mounted on pivot bearings (42). A travelling arm motor (27) drives movement of the travelling arm (16) and tensioning unit (2) through a drive screw (44). Fairleads (46, 48) at the cable entry point (20) and cable exit point (22) guide cable through the device. FIGS. 4A and 4B show the travelling arm (16) and tensioning unit (2) at the opposite first and second ends of its range of movement. FIG. 5 provides more detail of the drive gear arrangement for the belts. The belt drive motor (40) drives a rotating shaft and gear (46) which drives belt gears (50) via intermediate gear (48). Rotation of the belt gears (50) moves the belts (30) unaffected by pivoting of the travelling arm (16) and tensioning unit (2) around pivot bearings (42). It may also be that only one belt is driven.

Figure 1:
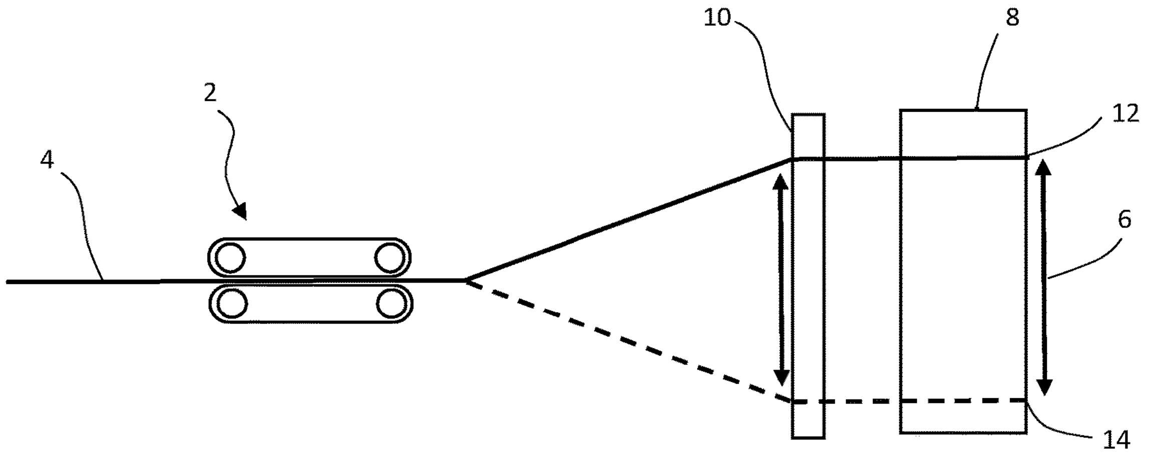
Fig. 1 (PRIOR ART)
FIG. 1 is a schematic diagram of a known spooling arrangement.

By forming the tensioning unit (2) as part of a travelling arm (16) which pivots in use, the space required for the apparatus is substantially reduced. In the arrangement of FIG. 1, the requirement for the fleet angle to not exceed around 2° means that the overall length of the apparatus is substantial. In the arrangement of FIG. 2, the tensioning unit (2) moves through what was effectively space for the cable to flex in the arrangement of FIG. 1 and so the overall device is more compact. In this arrangement, the travelling arm (16) and tensioning unit (2) effectively function as a spooling device.

In practice, the cable (4) curves slightly at the fairlead (46) at the cable entry point (20), within the limiting radius of curvature of the cable. The cable extends in a straight line from the cable exit point (22) to the cable storage portion (6) of the storage drum (8).

In order to unspool the cable (4), the tensioning unit (2) and storage drum motor (28) are operated in reverse. Cable thus passes from the cable storage portion (6) of the storage drum (8) through the tensioning unit (2), but in this case from cable exit point (22) to cable entry point (22). Again, the travelling arm (16) pivots so that the cable exit point (22)

moves in an arc between the first and second positions (24, 26) and the force to urge the cable is distributed between the tensioning unit (2) and storage drum motor (28).

In the example of FIG. 2, the tensioning unit is a linear tensioning unit (2). However, the person skilled in art will be aware of alternative tensioning units which are also useful for the purposes of the invention. For example, a tensioning unit may be formed by two curved belts, or by a single curved belt and a sheave between which the cable (4) is held and urged in use, and moved in the same way as part of a travelling arm. In these cases, the cable curves within the tensioning unit but would leave the cable exit point (22) to the storage drum in a straight line.

Although in the example shown in FIG. 2, the travelling arm (16) pivots relative to the base, It would also be possible for the travelling arm (16) to move laterally, backwards and forwards, relative to the base, between first and second positions (22, 26 respectively) for the cable exit point (22) at which cable is fed to first and second ends (12, 14 respectively) of the cable storage portion (6) of the storage drum (8).

Figure 6A:
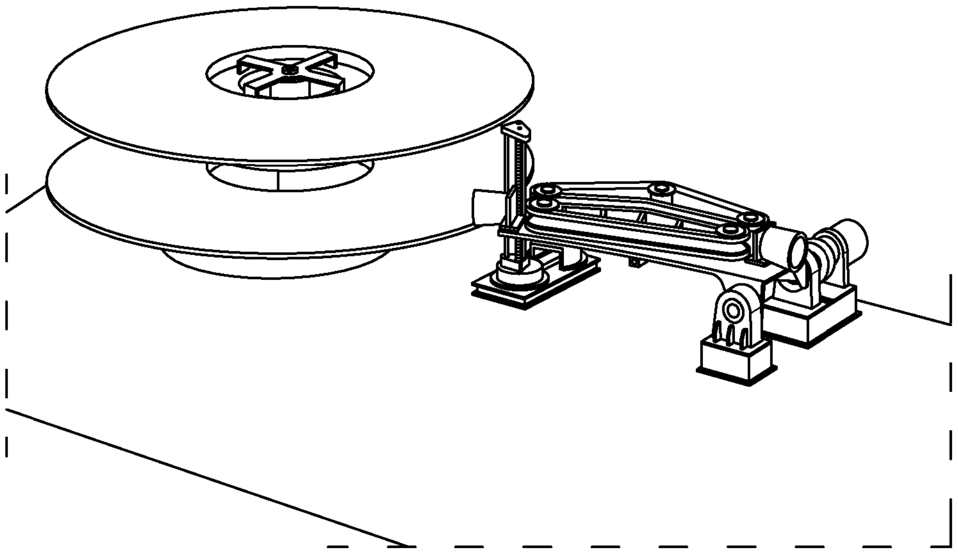
FIGS. 6A and 6B show schematic diagrams of the tensioning unit mounted in working configuration with a storage drum.
Figure 6B:
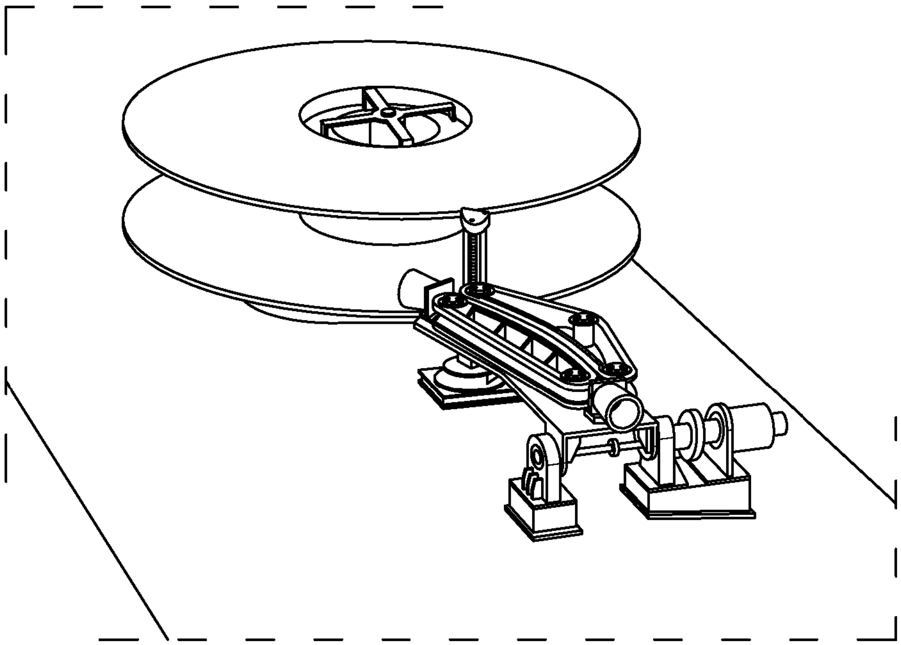

Schematic diagrams of the cable handling apparatus in its working configuration together with a storage drum for spooling cable are shown in FIGS. 6A and 6B.

Further modifications and variations may be made within the scope of the invention herein disclosed.

The invention claimed is:

1. A method of spooling a cable onto a storage drum, the method utilising a tensioning unit to tension said cable, whereby said cable enters a cable entry point of said tensioning unit and exits at a cable exit point of said tensioning unit, whereby the tensioning unit is mounted on a travelling member and travels in use driven by a travelling member drive mechanism driving movement of the travelling member such that the cable exit point of the tensioning unit traverses a path between first and second positions wherein in the first position the cable is fed to a first end of a cable storage portion of the storage drum and in the second position the cable is fed to an opposite second end of the cable storage portion of the storage drum; wherein the cable exit point of the tensioning unit travels along a curved path between the first and second positions and back again and the tensioning unit rotates in use.

2. A method according to claim 1, wherein the method comprises driving the tensioning unit to feed cable and driving the rotation of the storage drum in concert such that the force used to urge the cable through the tensioning unit onto the storage drum is shared between the tensioning unit and the storage drum.

3. A cable handling apparatus for use in conjunction with a storage drum for spooling cable, said apparatus comprising:

a support;

a travelling member moveably mounted to the support; and a tensioning unit for adjusting the tension of said cable, the tensioning unit mounted on said travelling member and having a cable entry point and a cable exit point, whereby cable, when present, extends from the cable exit point to the storage drum;

wherein the travelling member is moveably mounted to said support, such that the cable exit point traverses a path between first and second positions where the tensioning unit feeds cable to or from opposite first and second ends respectively of a cable storage portion of the storage drum;

wherein the cable handling apparatus further comprises a travelling member drive mechanism configured to drive the movement of the travelling member relative to the support; and wherein the travelling member is pivotably mounted to the support.

4. A cable handling apparatus according to claim 3, wherein the travelling member and tensioning unit are configured such that the cable, when present, extends from the cable exit point to the storage drum in a straight line.

5. A cable handling apparatus according to claim 3, wherein the tensioning unit is a transfer unit, or a linear tensioning unit or a curved tensioning unit.

6. A cable handling apparatus according to claim 3, wherein the tensioning unit comprises a sheave and belt.

7. A cable handling apparatus according to claim 3, wherein the first and second positions are aligned with the first and second ends of the cable storage portion.

8. A cable handling apparatus according to claim 3, wherein the tensioning unit and travelling member function as a spooling unit.

9. A cable handling apparatus according to claim 3, wherein the path between the first and second positions is curved.

10. A cable handling apparatus according to claim 3, wherein the travelling member is translatably coupled to the support such that the cable exit point moves laterally between the first and second positions in use.

11. A cable handling apparatus according to claim 3, in which the mechanism comprises a hoisting screw, a self-reversing screw, a belt, a linear actuator.

12. A cable handling apparatus according to claim 3, comprising a drive mechanism configured to both drive the tensioning unit to feed cable and to drive rotation of a storage drum to wind cable in concert.

13. A cable handling apparatus according to claim 3, further comprising a motor to operate said mechanism to drive.

14. A cable handling apparatus according to claim 3, wherein said tensioning unit comprises separate first and second gripping regions, spaced along the length of the cable, wherein at each region the cable is gripped from both sides and urged in an axial direction in use.

15. A cable handling apparatus for use in conjunction with a storage drum for spooling cable, said apparatus comprising:

a support;

a travelling member moveably mounted to the support; and a tensioning unit for adjusting the tension of said cable, the tensioning unit mounted on said travelling member and having a cable entry point and a cable exit point, whereby cable, when present, extends from the cable exit point to the storage drum; and wherein the travelling member is moveably mounted to said support, such that the cable exit point traverses a path between first and second positions where the tensioning unit feeds cable to or from opposite first and second ends respectively of a cable storage portion of the storage drum; and wherein the tensioning unit comprises two opposing belts which constrain the cable, when in place, to follow a curved path between the belts.

16. A cable handling apparatus for use in conjunction with a storage drum for spooling cable, said apparatus comprising:

a support;

a travelling member moveably mounted to the support; and a tensioning unit for adjusting the tension of said cable, the tensioning unit mounted on said travelling member and having a cable entry point and a cable exit point, whereby cable, when present, extends from the cable exit point to the storage drum;

wherein the travelling member is moveably mounted to said support, such that the cable exit point traverses a path between first and second positions where the tensioning unit feeds cable to or from opposite first and second ends respectively of a cable storage portion of the storage drum;

wherein the cable handling apparatus further comprises a travelling member drive mechanism configured to drive the movement of the travelling member relative to the support; and wherein the travelling member drive mechanism is configured to drive the movement of the travelling member relative to the support, whereby the tensioning unit is pivotably mounted to the support.

17. A cable handling apparatus for use in conjunction with a storage drum for spooling cable, said apparatus comprising:

a support;

a travelling member moveably mounted to the support; and a tensioning unit for adjusting the tension of said cable, the tensioning unit mounted on said travelling member and having a cable entry point and a cable exit point, whereby cable, when present, extends from the cable exit point to the storage drum;

wherein the travelling member is moveably mounted to said support, such that the cable exit point traverses a path between first and second positions where the tensioning unit feeds cable to or from opposite first and second ends respectively of a cable storage portion of the storage drum;

wherein the cable handling apparatus further comprises a travelling member drive mechanism configured to drive the movement of the travelling member relative to the support; and wherein the tensioning unit comprises two opposing belts which constrain the cable, when in place, to follow a curved path between the belts, which curved path lies in a plane which is in one position of the travelling member on the support, perpendicular to the axis of the storage drum axis.

* * * * *